United States Patent Office 3,503,818
Patented Mar. 31, 1970

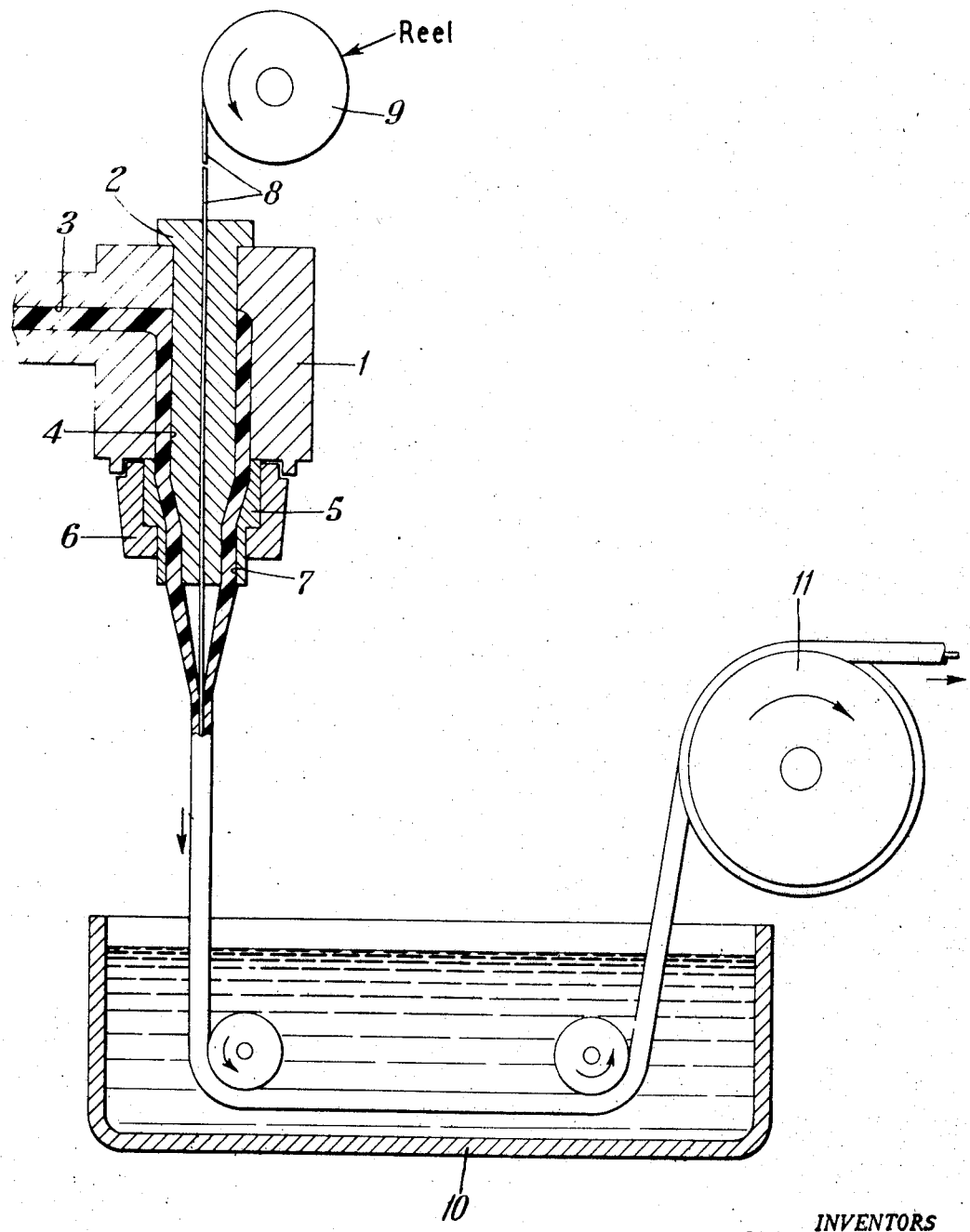

3,503,818
POLYARYLENE POLYETHER INSULATED CONDUCTORS AND PROCESS FOR MAKING SAME
John J. Helbling and Charles Neale Merriam, Martinsville, N.J., assignors to Union Carbide Corporation, a corporation of New York
Filed Dec. 1, 1966, Ser. No. 598,245
Int. Cl. H01b 13/14
U.S. Cl. 156—51
9 Claims

ABSTRACT OF THE DISCLOSURE

Electrical conductors such as wire insulated with molecular oriented thermoplastic polyarylene polyether amorphous polymers and an extrusion-stretching process for making the insulated conductors.

---

This invention relates to electrical conductors insulated with molecular oriented polyarylene polyethers which insulation is characterized by improved resistance to environmental stress cracking and crazing and improved resistance to thermal stress embrittlement and to a process for making such insulated conductors.

Thermoplastic polyarylene polyethers as described herein are amorphous polymers that exhibit excellent mechanical, physical, chemical and electrical properties, and are especially attractive for their superior thermal properties. These polymers are ductile (unlike other amorphous polymers that are usually brittle such as unmodified polystyrene), machinable, self-extinguishing and non-dripping, and are inert to both mineral acid and caustic. These polymers, however, when coated on an electrical conductor such as copper wire are susceptible to environmental stress cracking and crazing and to thermal stress embrittlement. These drawbacks prevent the use of polyarylene polyethers as electrical insulation because the coated wire must be capable of withstanding high levels of bending and twisting stress at normal and elevated temperatures and attack from various chemical compounds such as hand oils, for example.

It is known that thermoplastic polymers having a crystalline nature such as chlorotrifluoroethylene polymers, vinylidene chloride polymers, high density ethylene polymers and the like tend to be brittle because of crystalline growth. To overcome this crystalline growth these polymers are usually stretched and rapidly cooled when coated on a conductor to prevent crystalline growth thus producing a more flexible insulation. In the case of amorphous polymers such as unmodified polystyrene and polyacrylates which are normally brittle, it is known that some degree of stretching or orientation will make these polymers more ductile and tough. Thus it would not be expected that any improvement would be expected from orienting and/or rapidly cooling an already tough, ductile (non-brittle) amorphous polymer such as the polyarylene polyethers described herein.

It has been found, however, that conductors insulated with polyarylene polyethers which are characterized by improved resistance to environmental stress cracking and crazing and improved resistance to thermal stress embrittlement can be produced by extruding a continuous hollow form of polyarylene polyether having a wall thickness of from 5 to 50 times larger than the final desired insulation thickness, drawing said hollow form down to the desired thickness about an electrical conductor passing through said hollow form to orient said polyarylene polyether to a degree such that the breaking strength of the oriented insulation exceeds its yield strength and the elongation at break is at least 30 percent, and thereafter rapidly cooling the thus oriented insulation to a temperature below its heat distortion temperature. Breaking strength, yield strength and elongation after yield are determined according to ASTM D638, and heat distortion temperature is measured at 264 p.s.i. according to ASTM D648. Stated differently, the hollow form is drawn down about the electrical conduction to orient the polyarylene polyether to a degree such that the oriented insulation has a shrinkage value of at least 40 percent when heated to a temperature above its heat distortion temperature.

Thus the steps of drawing down or hot stretching results in an electrical conductor insulated with an oriented amorphous thermoplastic polyarylene polyether wherein the oriented insulation is oriented to a degree such that its breaking strength exceeds its yield strength and the elongation at break is at least 30 percent.

The draw down of a hollow form of polyarylene polyether having a thickness of from 5 to 50 times larger than the final desired insulation thickness is quite unusual and is due in part to the flow characteristics, low swell and strength while in the melt of the polyarylene polyethers. Also, the draw down can be carried out in a vertical or horizontal plane without ill effect. With other thermoplastic materials extrusion often has to be conducted vertically downward to insure uniform stretching due to the low melt strength of such materials. Moreover, with most melt fabricable thermoplastics the high degree of drawdown possible in the present invention cannot be approached because of instability of such materials in the melt.

One type of thermoplastic polyarylene polyether useful in the present invention are linear thermoplastic polymers having a basic structure composed of recurring units having the formula

$$—O—E—O—E'—  \qquad (I)$$

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-(4-hydroxyphenyl)-2-phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone (—SO$_2$), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

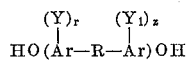
HO(Ar—R—Ar)OH wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, $r$ and $z$ are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —$SO_2$—, and divalent organic hydrocarbon radicals such as alkylene, alkylidene, cycloaliphatic, or the halogen, alkyl, aryl or like substituted alkylene, alkylidene and cycloaliphatic radicals as well as alkylicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenyl-methane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)-propane,
2,2-bis-(4-hydroxynaphthyl)propane,
2,2-bis(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane and the like;

Di(hydroxyphenyl)sulfones such as bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

Di(hydroxyphenyl)ethers such as bis-(4-hydroxyphenyl)-ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—$SO_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent groups which can activate displacement of halogens on two different rings, such as the sulfone group —$SO_2$—; the carbonyl group —CO—; the vinyl group —CH=CH—; the sulfoxide group —SO—; the azo group —N=N—; the saturated fluorocarbon groups —$CF_2$—$CF_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the bonzenoid compound" refers to the aromatic or benzenoid residue of the compound after the removal of the halogen atoms on the benzenoid nucleus.

From the foregoing it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

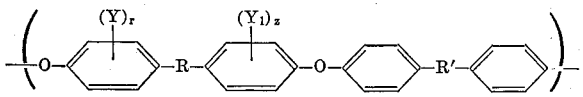

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inset substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, R is divalent connecting radical R''—C—R'' wherein R'' represents a member of the group consisting of hydrogen, lower alkyl, lower aryl, and the halogen substituted groups thereof, and R' is a sulfone group.

Thermoplastic polyarylene polyethers described herein can be prepared as described in U.S. Patent 3,264,536, issued Aug. 2, 1966, which is incorporated herein by reference, by a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared as described in Example 1 hereof and in the aforementioned U.S. patent in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

Thermoplastic polyarylene polyethers (Formula I) as described herein are characterized by high molecular weights indicated by reduced viscosity in indicated solvents. For purposes of the present invention, it is preferred that thermoplastic polyarylene polyethers (Formula I) have a reduced viscosity above about 0.5 and most preferably above about 0.65. The manner of determining reduced viscosity is detailed infra.

Another type of polyarylene polyether useful in this invention are thermoplastic polymers composed of recurring units having the formula viscosity of at least 0.07. Intrinsic viscosity is determined by dissolving the polymer in a good solvent for the polymer. A good solvent is defined as a solvent which will produce solutions of various concentrations such that when the viscosity is plotted against concentration, a straight line is obtained. Extrapolation of this line to zero concentration gives the intrinsic viscosity. See Buck et al., High Molecular Weight Organic Compounds, Interscience Publishers, Inc., New York (1949), pages 75–110.

Typical examples of the monovalent hydrocarbon radicals that R, R' and R'' may be are alkyl, including cycloalkyl, for example methyl, ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, octyldecyl, and so forth; alkenyl, including cycloalkenyl, for example, vinyl, allyl, butenyl, cyclobutenyl, isopentenyl, cyclopentenyl, linolyl, etc.; alkynyl, for example propargyl, etc.; aryl, including alkaryl, for example, phenyl, tolyl, ethylphenyl, xylyl, naphthyl, methylnaphthyl, etc., aralkyl, for example, benzyl, phenylethyl, phenylpropyl, tolylethyl, etc. The monovalent halohydrocarbon radicals may be the same as the hydrocarbon radicals, as outlined above, except methyl, wherein one or more of the hydrogen atoms are replaced by halogens, examples of which are chloroethyl, bromoethyl, fluoroethyl, dichloroethyl, bromoethyl, fluoroethyl, dichloroethyl, bromopropyl, dichlorodifluoroethyl, difluoroiodoethyl, bromobutyl, fluoroamyl, chlorovinyl, bromoallyl, fluoropropargyl, mono-, di-, tri-, tetra- and pentachlorophenyl, mono-, di-, tri- and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent alkoxy radicals are methoxy, ethoxy, propoxy, isopropoxy, butoxy, secondary butoxy, tertiary butoxy, amoxy, hexoxy, octoxy, decoxy, vinoxy, alloxy, butenoxy, propargoxy, benzoxy, phenylethoxy, phenylpropoxy, tolylethoxy, etc. The monovalent haloalkoxy radicals may be the same as the above oxyhydrocarbons except methoxy, where one or more of the hydrogens are replaced by a halogen, for example, fluorine, chlorine, bromine, or iodine, a few typical examples of which are chloroethoxy, bromoethoxy, fluoroethoxy, dichloroethoxy, bromopropoxy, difluorochloroethoxy, iodobutoxy, fluoroamoxy, chlorovinoxy, bromoalloxy, fluoropropargoxy, bromobenzoxy, chlorophenylethoxy, phenylchloroethoxy, bromotolylethoxy, etc. Preferably R' and R'' are each hydrogen, R is a hydrocarbon radical of from 1 to 10 carbon atoms and the phenoxy substituent is in the para position.

Thermoplastic polyarylene polyethers of the class described herein (Formula II) can be prepared by reacting oxygen and an aryloxy-substituted monohydric phenol in the presence of a catalyst comprising a tertiary amine and a cuprous salt. A detailed description of the

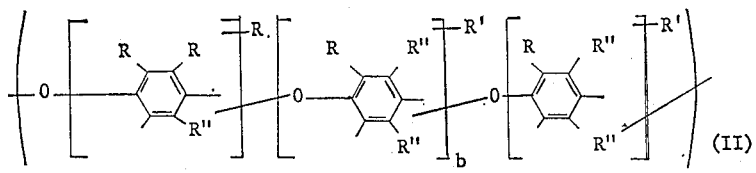

where the free valence of the terminal oxygen atom of one unit is connected to the free valence of the terminal benzene nucleus of the adjoining unit, b is an integer of from 0 to 1 inclusive, R is a monovalent substituent selected from the group of hydrocarbon radicals, halohydrocarbon radicals having at least 2 carbon atoms, alkoxy radicals and haloalkoxy radicals having at least 2 carbon atoms, R' and R'' are the same as R and in addition hydrogen. Suitable polyarylene polyethers have an intrinsic preparation of these polymers is contained in U.S. Patent 3,134,753, which is incorporated herein by reference.

For purposes of the present invention, it is important than the water content of the polyarylene polyether when extruded into a hollow form be less than about 0.05% by weight, based on the weight of the polymer, otherwise bubbles and voids will appear in the insulation which can cause spark failure. Water content of the polymer can be reduced to less than about 0.05% by heating at about 120° C. for 3 to 4 hours in an air circulating oven to drive off the water.

The invention will be more fully described with reference to the accompanying drawing showing suitable apparatus for orienting the polyarylene polyether and applying same about an electrical conductor.

Referring to the drawing, 1 represents a crosshead vertically secured to the discharge end of a horizontally extending extruder cylinder (not shown). The attitude of crosshead 1 is not critical and varies from the vertical position shown in the drawing to a horizontal position. An opening extends throughout the length of crosshead 1 and receives a guider pin 2. Polyarylene polyether, as it is forced from the extruder cylinder, enters the crosshead from passage 3 and is fed to an annular passage 4 formed by a portion of the wall surface of the crosshead and a portion of the surface of the guider pin. The guider pin 2 extends downwardly from the crosshead 1 and tapers inwardly over a portion of its length to a point where it remains constant in diameter. A die 5 is positioned by means of a die holder 6 about that portion of a guider pin extending from the crosshead so as to cooperate with the guider pin to form an annular passage 7.

A passage extends throughout the length of the guider pin to permit an electrical conductor 8 wound on reel 9 to pass therethrough and be positioned within the extruded hollow continuous form of polyarylene polyether leaving annular passage 7. The extruded form is drawn about the conductor and the insulated conductor directed to quenching trough 10. A suitable quenching medium is water. After quenching, the insulated conductor is passed about capstan 11 which controls the rate of speed at which it passes through the apparatus and is subsequently directed to take-up reels (not shown). As may be seen from the drawing the over-sized tubular-shaped form is gradually reduced in thickness as a result of the drawing operation.

The outer surface diameter of the guider pin and the inner surface diameter of the die, forming annular passage 7, are of such size as to result in the extrusion of a hollow form having a thickness of from about 5 to 50 times the thickness of the final desired thickness of insulation for the conductor. Orientation of the hollow form of polyarylene ether is accomplished by drawing the over-sized form as it exists from annular passage 7. Drawing is affected by maintaining the rate of speed at which the conductor is pulled through the guider pin by capstan 11, greater than that at which the polymer is extruded. As the form is from 5 to 50 times greater in thickness than the final desired thickness of insulation, the draw down ratio of initial thickness to final thickness must lie within the range of from 5 to 1 to about 50 to 1, and thus the rate of speed of the conductor 8 is a direct function of the reduction in thickness and will vary from about 25 to about 2500 times the rate of speed at which polyarylene polyether tubing is extruded.

The following examples are illustrative of the present invention and are not intended to limit the same in any manner. All parts and percentages are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{c.t_o}$$

wherein:

$t_o$ is the efflux time of the pure solvent
$t_s$ is the efflux time of polymer solution
$c$ is the concentration of the polymer solution expressed in terms of grams of polymer per 100 ml. of solution.

EXAMPLE 1

Preparation of thermoplastic polyarylene polyether—

Formula I

In a 250 ml. flask equipped with a stirrer, the thermometer, a water cooled condenser and a Dean Stark moisture trap filled with benzene, there were placed 11.42 grams of 2,2-bis-(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C. consisting of the dipotassium salt of the 2,2-bis-(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130°–140° with good stirring for 4–5 hours. The viscous, orange solution was poured into 300 ml. water, rapidly circulating in a Waring Blendor, and the finely divided white polymer was filtered and then dried in a vacuum oven at 100° for 16 hours. The yield was 22.2 g. (100%) and the reaction was 99% complete based on a titration for residual base.

The polymer had the basic structure

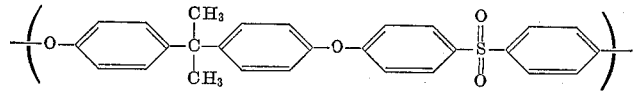

This polymer had the following properties:

| Property | ASTM method | Value |
| --- | --- | --- |
| Tensile strength at yield, p.s.i. | D638 | 10,200 |
| Tensile modulus, p.s.i. | D638 | 360,000 |
| Tensile elongation at break, percent | D638 | 50–100 |
| Flexural strength, p.s.i. | D790 | 15,400 |
| Flexural modulus, p.s.i. | D790 | 390,000 |
| Heat distortion temp. at 264 p.s.i., °F. | D648 | 345 |
| Coefficient of linear thermal expansion, in./in./°F. | D635 | $3.1{-}10^{-5}$ |
| Flammability | D635 | [1] |
| Dielectric strength, 1/8" spec., ST, v./mil | D149 | 425 |
| Arc resistance, sec. | D495 | 122 |
| Volume resistivity, at 72° F., ohm-cm | D257 | $5 \times 10^{16}$ |
| Volume resistivity, at 347° F., ohm-cm | D257 | $5 \times 10^{14}$ |
| Dielectric constant, at 72° F., 60 c.p.s.–1 mc | D150 | 3.14 |
| Dielectric constant, at 347° F., 60 c.p.s.–1 mc | D150 | 2.82–2.73 |
| Dissipation factor, at 72° F., 60 c.p.s.–1 mc | D150 | 0.0008–0.0056 |
| Dissipation factor, at 347° F., 60 c.p.s.–1 mc | D150 | 0.008–0.003 |

[1] Self-extinguishing.

EXAMPLE 2

Preparation of thermoplastic polyarylene polyether—Formula II

Oxygen is passed for a few minutes through a mixture of 0.4 g. of cuprous chloride and 30 ml. of pyridine to aid in the dissolving of the cuprous salt. Four grams of 2,6-dimethyl-4-(2',6'-dimethylphenoxy) phenol is added to the mixture. Oxygen is passed therethrough at a rate fast enough to provide an excess over that being adsorbed with vigorous stirring. The initial temperature is 29.5° C. and rises to 51.5 during a 3 minute reaction period. Thereafter 360 ml. of an aqueous 2 N solution of HCl is added to precipitate the polymer. The polymer is then dissolved in chloroform and precipitated by adding dropwise to methanol containing 1% by volume of 12 N HCl. This last purification step is repeated. The solid product is poly(2,6-dimethylphenylene-1,4)ether composed of recurring units having the formula

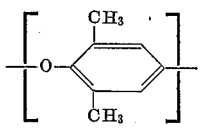

The isolated polymer has an intrinsic viscosity of 1.22 and had the following properties:

| Property | ASTM method | Value |
|---|---|---|
| Tensile strength at 73° F., yield | D638 | 10,000–11,000 |
| Tensile strength at 73° F., fail | D638 | 9,000–10,000 |
| Tensile strength at 257° F., yield | D638 | 5,500–6,500 |
| Tensile strength at 257° F., fail | D638 | 4,500–5,500 |
| Tensile modulus at 73° F., p.s.i. | D638 | $3.6–3.8\times10^5$ |
| Tensile modulus at 257° F., p.s.i. | D638 | $3.3–3.4\times10^5$ |
| Elongation at 73° F., yield percent | D638 | 6–7 |
| Elongation at 73° F., fail percent | D638 | 50–80 |
| Flexural strength at 73° F., p.s.i. | D790 | 14,000–15,000 |
| Flexural modulus at 73° F. | D790 | $3.5–3.8\times10^5$ |
| Heat deflection at 264 p.s.i., ° F. | D648 | 375–380 |
| Coefficient of linear expansion, in./in./° F. | D696 | $2.7–3.1\times10^{-5}$ |
| Flammability | D635 | (1) |
| Dielectric strength, short time, volts/mil | D149 | 400–500 |
| Volume resistivity, ohm-cm | D257 | $10^{17}$ |
| Dielectric constant at 23° C., 60 cycles | D150 | 2.58 |
| Dielectric constant at 23° C., $10^6$ cycles | D150 | 2.58 |
| Dissipation factor at 23° C., 60 cycles | D150 | 0.00035 |
| Dissipation factor at 23° C., $10^6$ cycles | D150 | 0.0009 |

[1] Self-extinguishing.

EXAMPLE 3

Polyarylene polyether prepared as in Example 1 and having a RV of 0.62 was extruded horizontally at a temperature of 320° C. through a crosshead as shown in the drawing in the form of a tube having a wall thickness of 100 mils at a rate of 0.5 ft. per min. Copper wire 27 mils in diameter was pulled through the guider pin at the rates indicated in Table I below. Drawdown of the extruded tubing was accomplished over a distance of one foot to produce an oriented wire coating having a thickness of 5 to 15 mils depending on the wire speed. The coated wire was then quenched in water maintained at a temperature of about 230° C. and wound up. A portion of the insulation was then stripped off of the wire and tested. Results were as follows:

TABLE I

| Wire speed, feet/min. | Tensile modulus, p.s.i. | Yield strength, p.s.i. | Tensile strength, p.s.i. | Elongation at break, percent |
|---|---|---|---|---|
| Control | 250,000–300,000 | 9,000 | 9,000 | 100 |
| 150 | 280,000 | 8,000 | 13,000 | 135 |
| 200 | 300,000 | 10,000 | 12,000 | 95 |
| 255 | 400,000 | 11,000 | 15,500 | 85 |
| 300 | 430,000 | 13,000 | 17,000 | 65 |
| 350 | 360,000 | 12,000 | 16,500 | 70 |
| 400 | 420,000 | 13,000 | 17,500 | 50 |

The table illustrates the improvement in tensile properties and yield strength gained through the present invention. Also, unoriented wire coatings crack and craze badly after being handled by hand whereas samples prepared in this example exhibit good resistance to this source of environmental attack.

EXAMPLE 4

This example demonstrates the improved resistance to thermal stress embrittlement gained by the present invention. The criteria used are retention of ductility and retention of dielectric breakdown strength. Ductility was measured by heat aging "pigtail" samples bent in the form of a loop and wound upon itself several times. Different sections of the pigtail were then bent, flexed or unwound. The formation of open cracks constituted a failure. The dielectric strength is the potential required to break down the insulation. Any fissure or crack in the insulation will result in a low voltage to breakdown. Insulated wire samples were prepared as in Example 3 from polyarylene polyether prepared as in Example 1 having an RV of 0.72. A portion of the insulation was also stripped off of the wire and tested for elongation at break. The insulation was also tested for its reaction to hand oils. Results are summarized in Table II.

TABLE II.—AGED IN AIR DIELECTIC STRENGTH (VOLTS/MIL)

| Wire speed, ft./min. | 28° C. | 120° C. 1 day | 120° C. 1 week | 120° C. 1 month | 150° C. 1 day | 150° C. 1 week | 150° C. 1 month | 170° C. 1 day | 170° C. 1 week | 170° C. 1 month |
|---|---|---|---|---|---|---|---|---|---|---|
| Control (0) | 2,000 | 1,600 | 1,200 | 1,300 | 1,000 | (1) | 2,000 | 1,800 | 2,400 | 2,600 |
| 150 | 2,400 | 1,900 | 1,700 | 2,000 | 2,000 | 2,000 | 1,700 | 1,900 | 2,000 | 2,900 |
| 200 | 2,200 | 2,000 | 2,000 | 1,300 | 1,700 | 2,800 | 1,700 | 1,900 | 2,000 | 2,200 |
| 250 | 1,200 | 950 | 1,700 | 1,400 | 1,900 | 3,000 | 1,900 | 1,200 | 2,900 | 2,400 |
| 300 | | | | | 1,800 | 1,100 | 2,100 | 1,000 | | |

Aged in Air, Elongation at Break, percent

| Wire speed | 28° C. | 120° C. 1 day | 120° C. 1 week | 120° C. 1 month | 150° C. 1 day | 150° C. 1 week | 150° C. 1 month | 170° C. 1 day | 170° C. 1 week | 170° C. 1 month |
|---|---|---|---|---|---|---|---|---|---|---|
| Control (0) | 100 | 60 | 60 | 60 | 45 | 50 | 20 | 8 | 10 | 7 |
| 150 | 100 | 95 | 100 | 90 | 105 | 98 | 90 | 95 | 105 | 40 |
| 200 | 66 | 72 | 75 | 68 | 75 | 55 | 45 | 70 | | |
| 250 | 57 | 40 | 65 | 58 | 40 | | | | | |

Aged in Air at 150° C., Ductility Test

| 1 day | 1 week | 1 month | 4 days | 1 month | Reaction to Hand oils |
|---|---|---|---|---|---|
| | | | Failed | Failed | Crazed. |
| | | | Pass | Pass | No Crazing. |
| | | | do | do | Do. |
| | | | do | do | Do. |
| | | | do | do | Do. |

[1] Failed.

EXAMPLE 5

Example 4 is duplicated using as the insulation thermoplastic polyarylene polyether having the formula

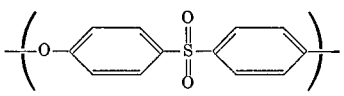

prepared from 4,4'-dihydroxydiphenyl sulfone and 4,4'-dichlorodiphenyl sulfone according to the procedure in Example 1. Improvements in ductility, resistance to hand oils and thermal stress embrittlement are noted for the oriented or stretched insulation as compared to unoriented insulation of the same polymer.

EXAMPLE 6

Example 4 is duplicated using as the insulation thermoplastic polyarylene polyether having the formula

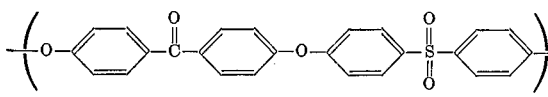

prepared from the bisphenol of benzophenone and 4,4'-dichlorodiphenylsulfone according to the procedure in Example 1. Improvements in ductility, resistance to hand oils and thermal stress embrittlement are noted for the oriented or stretched insulation as compared to unoriented insulation of the same polymer.

EXAMPLE 7

Example 4 is duplicated using as the insulation thermoplastic polyarylene polyether having the formula

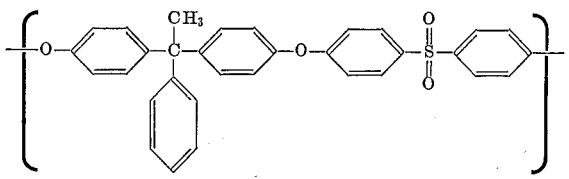

prepared from the bisphenol of acetophenone and 4,4'-dichlorodiphenylsulfone according to the procedure in Example 1. Improvements in ductility, resistance to hand oils and thermal stress embrittlement are noted for the oriented or stretched insulation as compared to unoriented insulation of the same polymer.

EXAMPLE 8

Example 4 is duplicated using as the insulation thermoplastic polyarylene polyether having the formula

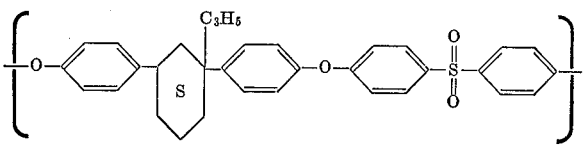

prepared from the bisphenol of vinyl cyclohexene (prepared by an acid catalyzed condensation of 2 moles of phenol with one mole of vinyl cyclohexane) and 4,4'-dichlorodiphenylsulfone according to the procedure in Example 1. Improvements in ductility, resistance to hand oils and thermal stress embrittlement are noted for the oriented or stretched insulation as compared to unoriented insulation of the same polymer.

EXAMPLE 9

Example 4 is duplicated using as the insulation thermoplastic polyarylene polyether having the formula

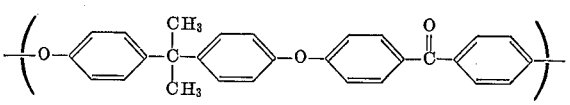

prepared from 2,2'-bis-(4-hydroxyphenyl)propane and 4,4'-difluorobenzophenone according to the procedure in Example 1. Improvements in ductility, resistance to hand oils and thermal stress embrittlement are noted for the oriented or stretched insulation as compared to unoriented insulation of the same polymer.

EXAMPLE 10

Example 4 is duplicated using as the insulation thermoplastic polyarylene polyether having the formula

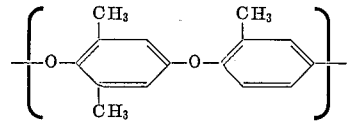

prepared from 2,6-dimethyl-4-(2'-methylphenoxy)phenol according to the procedure of Example 2. Improvements in ductility, resistance to hand oils and thermal stress embrittlement are noted for the oriented or stretched insulation as compared to unoriented insulation of the same polymer.

EXAMPLE 11

Example 4 is duplicated using as the insulation thermoplastic polyarylene polyether having the formula

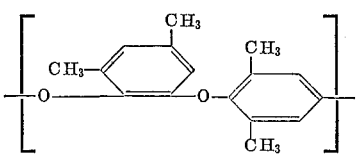

prepared from 2,4 - dimethyl-6-(2',6'-dimethylphenoxy)phenol according to the procedure in Example 2. Improvements in ductility, resistance to hand oils and thermal stress embrittlement are noted for the oriented or stretched insulation as compared to unoriented insulation of the same polymer.

EXAMPLE 12

Example 4 is duplicated using as the insulation thermoplastic polyarylene polyether having the formula

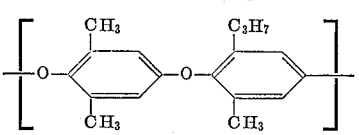

prepared from 2,6 - dimethyl - 4-(2'-n-propyl-6'-methylphenoxy)phenol according to the procedure in Example 2. Improvements in ductility, resistance to hand oils and thermal stress embrittlement are noted for the oriented or stretched insulation as compared to unoriented insulation of the same polymer.

EXAMPLE 13

Example 4 is duplicated using as the insulation thermoplastic polyarylene polyether having the formula

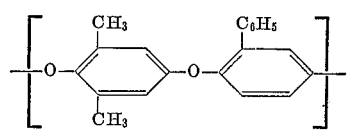

prepared from 2,6-dimethyl-4-(2'-phenylphenoxy)phenol according to the procedure in Example 2. Improvements in ductility, resistance to hand oils and thermal stress embrittlement are noted for the oriented or stretched insulation as compared to unoriented insulation of the same polymer.

EXAMPLE 14

Example 4 is duplicated using as the insulation thermoplastic polyarylene polyether prepared as in Example 2. Improvements in ductility, resistance to hand oils and thermal stress embrittlement are noted for the oriented or stretched insulation as compared to unoriented insulation of the same polymer.

What is claimed is:

1. Electrical conductor insulated with oriented, amorphous thermoplastic polyarylene polyether, said polyarylene polyether having a degree of orientation such that the breaking strength exceeds the yield strength of the insulation and the elongation at break is at least 30 percent said insulation being extruded at a wall thickness of from 5 to 50 times larger than the final insulation thickness onto said conductor moving at a speed greater than that at which said polymer is extruded.

2. Electrical conductor of claim 1 wherein the insulation is a linear thermoplastic polyarylene polyether composed of recurring units having the formula:

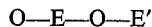

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

3. Electrical conductor of claim 2 wherein said polyarylene polyether is composed of recurring units having the formula

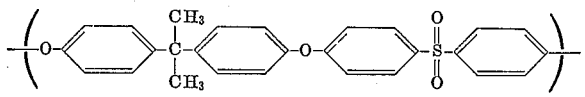

4. Electrical conductor of claim 2 wherein said polyarylene polyether is composed of recurring units having the formula

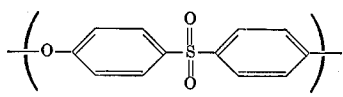

5. Electrical conductor of claim 1 wherein the insulation is a thermoplastic polyarylene polyether composed of recurring units having the formula,

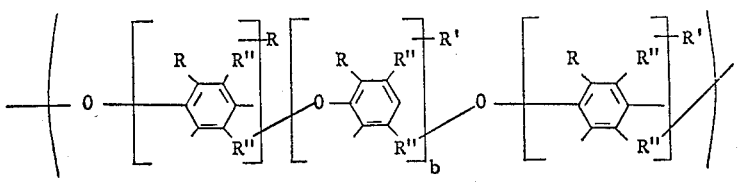

wherein the free valence of the terminal oxygen atom of one unit is connected to the free valence of the terminal benzene nucleus of the adjoining unit, b is an integer of from 0 to 1 inclusive, R is a monovalent substituent selected from the group of hydrocarbon radicals, halohydrocarbon radicals having at least 2 carbon atoms, alkoxy radicals, and haloalkoxy radicals having at least 2 carbon atoms, R' and R" are the same as R and in addition hydrogen.

6. Electrical conductor of claim 5 wherein said polyarylene polyether is composed of recurring units having the formula

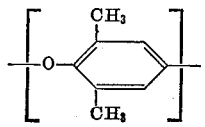

7. Process for preparing an electrical conductor insulated with oriented thermoplastic polyarylene polyether which comprises extruding a continuous hollow form of said polyarylene polyether having a wall thickness of from about 5 to 50 times larger than the desired insulation thickness, drawing said hollow form down to the desired thickness about an electrical conductor passing through said hollow form at a speed greater than the rate of extrusion thereby orienting said polyarylene polyether to a degree such that the breaking strength of the insulation exceeds its yield strength and the elongation at break is at least 30 percent.

8. Process of claim 7 wherein the insulation is formed from a linear thermoplastic polyarylene polyether composed of recurring units having the formula

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

9. Process of claim 7 wherein the insulation is formed from a thermoplastic polyarylene polyether composed of recurring units having the formula

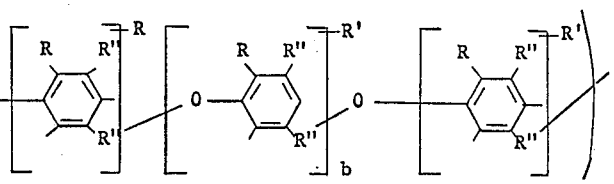

wherein the free valence of the terminal oxygen atom of one unit is connected to the free valence of the terminal benzene nucleus of the adjoining unit, b is an integer of from 0 to 1 inclusive, R is a monovalent substituent selected from the group of hydrocarbon radicals, halohydrocarbon radicals having at least 2 carbon atoms, alkoxy radicals, and haloalkoxy radicals having at least 2 carbon atoms, R' and R" are the same as R and in addition hydrogen.

References Cited

UNITED STATES PATENTS

| | | | |
|---|---|---|---|
| 3,134,753 | 5/1964 | Kwiatek | 260—47 |
| 3,229,012 | 1/1966 | Garner | 264—174 |
| 3,264,536 | 8/1966 | Robinson et al. | 252—63.2 X |
| 3,275,730 | 9/1966 | Feild | 264—174 |

VERLIN R. PENDEGRASS, Primary Examiner

U.S. Cl. X.R.

174—110